US010255227B2

(12) United States Patent
Ku et al.

(10) Patent No.: US 10,255,227 B2
(45) Date of Patent: Apr. 9, 2019

(54) COMPUTERIZED SYSTEM AND METHOD FOR AUTHORING, EDITING, AND DELIVERING AN INTERACTIVE SOCIAL MEDIA VIDEO

(71) Applicant: OATH INC., New York, NY (US)

(72) Inventors: Hans T. Ku, La Canada Flintridge, CA (US); Edwin R. Leonard, Glendora, CA (US); David M. Koenig, Los Angeles, CA (US); Gene Z. Ragan, Los Angeles, CA (US)

(73) Assignee: OATH INC., New York, NY (US)

( * ) Notice: Subject to any disclaimer, the term of this patent is extended or adjusted under 35 U.S.C. 154(b) by 463 days.

(21) Appl. No.: 13/838,801

(22) Filed: Mar. 15, 2013

(65) Prior Publication Data

US 2013/0311561 A1 Nov. 21, 2013

Related U.S. Application Data

(60) Provisional application No. 61/649,916, filed on May 21, 2012.

(51) Int. Cl.

| | |
|---|---|
| ***H04N 5/93*** | (2006.01) |
| ***G11B 27/00*** | (2006.01) |
| ***G06F 15/163*** | (2006.01) |
| ***G06F 3/0484*** | (2013.01) |
| ***G11B 27/031*** | (2006.01) |
| ***G06F 3/0488*** | (2013.01) |
| ***G11B 27/34*** | (2006.01) |

(Continued)

(52) U.S. Cl.
CPC .......... *G06F 15/163* (2013.01); *G06F 3/0484* (2013.01); *G06F 3/04883* (2013.01); *G11B 27/031* (2013.01); *G11B 27/34* (2013.01); *H04N 21/4788* (2013.01); *H04N 21/854* (2013.01); *G06F 2203/04803* (2013.01); *H04N 21/4755* (2013.01); *H04N 21/482* (2013.01)

(58) Field of Classification Search
CPC . G06F 3/0484; G06F 15/163; H04L 12/2494; H04L 41/509
USPC .......................................................... 709/204
See application file for complete search history.

(56) References Cited

U.S. PATENT DOCUMENTS

| | | | |
|---|---|---|---|
| 6,295,058 | B1 | 9/2001 | Hsu et al. |
| 6,389,181 | B2 | 5/2002 | Shaffer et al. |

(Continued)

*Primary Examiner* — Esther B. Henderson
*Assistant Examiner* — Golam Mahmud
(74) *Attorney, Agent, or Firm* — James J. DeCarlo; Greenberg Traurig, LLP

(57) ABSTRACT

A social media video system provides for the authoring, archiving, and/or delivering of interactive social media videos. A social media video includes one or more media assets, which may be images, video clips, music clips, text verbiages, or the like. A social media video may be associated with a style profile that provides visual and/or aural effects that are pleasing, to a social media video viewer. The social media video system maintains social media videos in a template format, and may defer the rendering of a social media video until it is selected for viewing. The maintaining of social media videos in template format allows for efficient transmission and editing of social media videos. A social media video that is created and shared by one user may be modified and be shared again. In this way, users can collaborate to create, critique, and iterate social media videos.

21 Claims, 16 Drawing Sheets

(51) Int. Cl.
*H04N 21/4788* (2011.01)
*H04N 21/854* (2011.01)
*H04N 21/475* (2011.01)
*H04N 21/482* (2011.01)

(56) References Cited

U.S. PATENT DOCUMENTS 6,473,778 B1 10/2002 Gibbon
6,590,586 B1 7/2003 Swenton-Wall et al.
6,964,025 B2 11/2005 Angiulo et al.
7,003,583 B2 2/2006 Cho et al.
7,349,923 B2 3/2008 Spring et al.
7,362,919 B2 4/2008 Das et al.
7,657,835 B2 2/2010 Mindrum et al.
7,680,882 B2 3/2010 Tiu, Jr. et al.
7,730,043 B1 * 6/2010 Bourdev ................. G06T 11/60 707/695
7,849,083 B2 12/2010 Fitzpatrick
7,921,111 B1 * 4/2011 Beddow ............ G06F 17/30044 707/736
7,979,790 B2 7/2011 Truelove et al.
8,010,629 B2 8/2011 Lanahan et al.
8,117,548 B1 * 2/2012 Ragan ................. G06F 3/04817 715/746
D696,688 S * 12/2013 Yuk .............................. D14/486
8,862,173 B2 * 10/2014 Marocchi ............. G08B 27/006 340/539.11
9,344,745 B2 * 5/2016 Gottlieb ................... H04N 7/15
2005/0246649 A1 11/2005 Wilhelm
2006/0004892 A1 1/2006 Lunt et al.
2006/0182425 A1 * 8/2006 Boerger ............... G11B 27/034 386/219
2006/0192791 A1 * 8/2006 Schick ............... H04N 1/00132 345/661
2006/0253783 A1 11/2006 Vronay et al.
2007/0043761 A1 2/2007 Chim et al.
2007/0073776 A1 3/2007 Kalalian et al.
2007/0101271 A1 5/2007 Hua et al.
2007/0255785 A1 11/2007 Hayashi et al.
2008/0052349 A1 2/2008 Lin
2008/0092051 A1 4/2008 Sidon et al.
2008/0133658 A1 6/2008 Pennington
2008/0189591 A1 8/2008 Lection
2008/0205694 A1 8/2008 Sagoo et al.
2008/0215964 A1 9/2008 Abrams et al.
2008/0215965 A1 9/2008 Abrams et al.
2008/0215985 A1 9/2008 Batchelder et al.
2009/0083646 A1 3/2009 Lin et al.
2009/0132527 A1 5/2009 Sheshagiri et al.
2009/0144392 A1 6/2009 Wang et al.
2009/0198823 A1 8/2009 Bannister et al.
2009/0254643 A1 10/2009 Terheggen et al.
2009/0259944 A1 10/2009 Wu
2009/0327035 A1 12/2009 Allard
2010/0005119 A1 1/2010 Howard et al.
2010/0005139 A1 1/2010 Lanahan et al.
2010/0042926 A1 2/2010 Bull et al.
2010/0060772 A1 * 3/2010 Nihei ................. H04N 1/00442 348/333.01
2010/0083141 A1 4/2010 Grace
2010/0161635 A1 6/2010 Dey
2010/0220197 A1 * 9/2010 Dukellis ............ G06Q 30/0253 348/207.1
2010/0325547 A1 12/2010 Keng et al.
2011/0311199 A1 * 12/2011 Fay ...................... G11B 27/034 386/241
2012/0079577 A1 * 3/2012 Hao ........................ H04L 63/10 726/7
2012/0144373 A1 * 6/2012 Cook ........................ G06F 8/38 717/125
2012/0176401 A1 * 7/2012 Hayward .............. G06T 3/0093 345/619
2013/0179925 A1 * 7/2013 Woods ............. H04N 21/42209 725/42
2013/0239163 A1 * 9/2013 Kim ................... H04N 21/2665 725/115
2014/0028915 A1 * 1/2014 Kim ................... H04N 21/4316 348/518
2014/0334795 A1 * 11/2014 Dobrowolski ... H04N 21/42204 386/234
2015/0012845 A1 * 1/2015 Ta ....................... H04L 12/1813 715/753
2015/0046847 A1 * 2/2015 Nims ................. A63B 24/0059 715/757
2017/0168697 A1 * 6/2017 Shpalter ................ G06F 3/0482

* cited by examiner

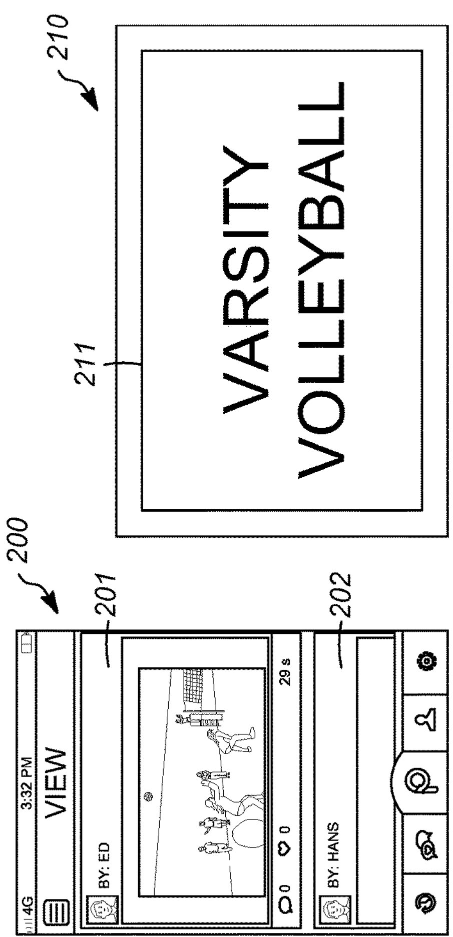
FIG. 2A
FIG. 2B
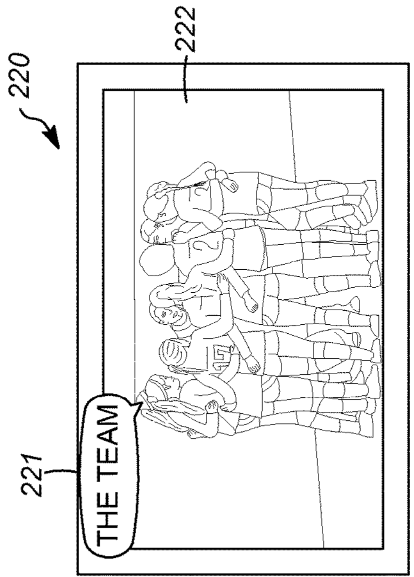
FIG. 2C
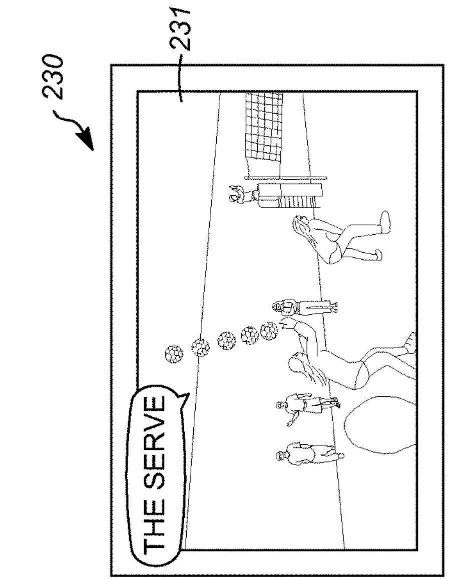
FIG. 2D
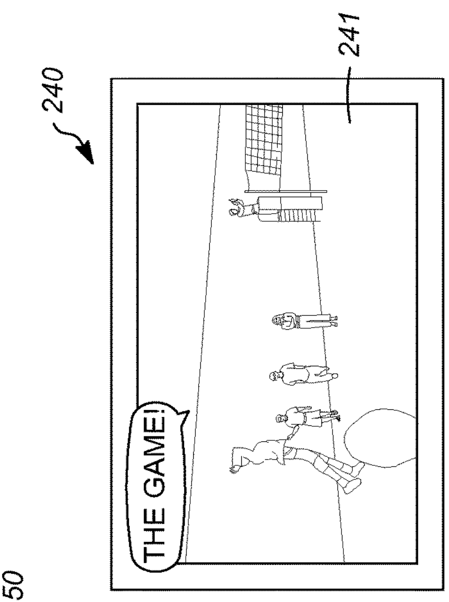
FIG. 2E
FIG. 2F

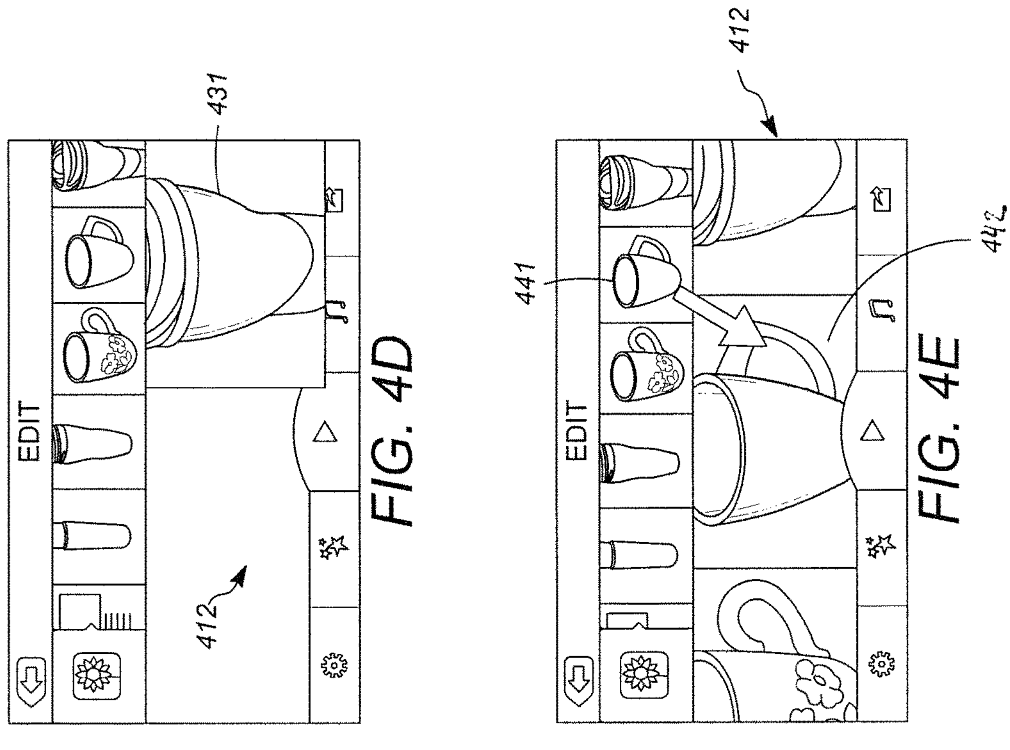
FIG. 4D
FIG. 4E
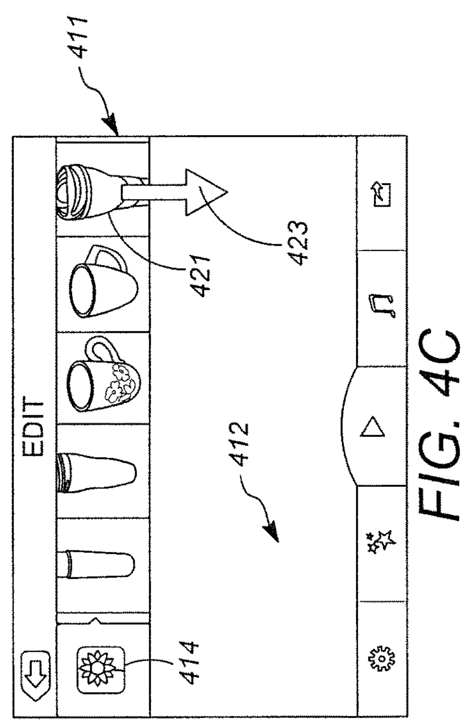
FIG. 4C

810
STYLES
MATTE
SOHO
EPIC
VIVID
APPLIED
811
APPLY
APPLY
APPLY
FIG. 8A
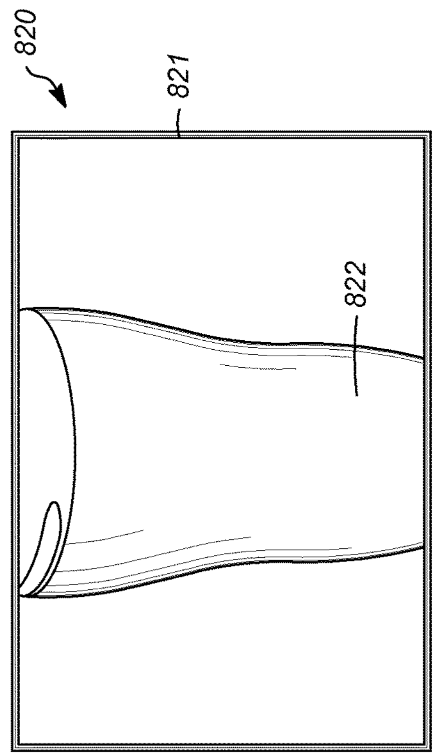
FIG. 8B
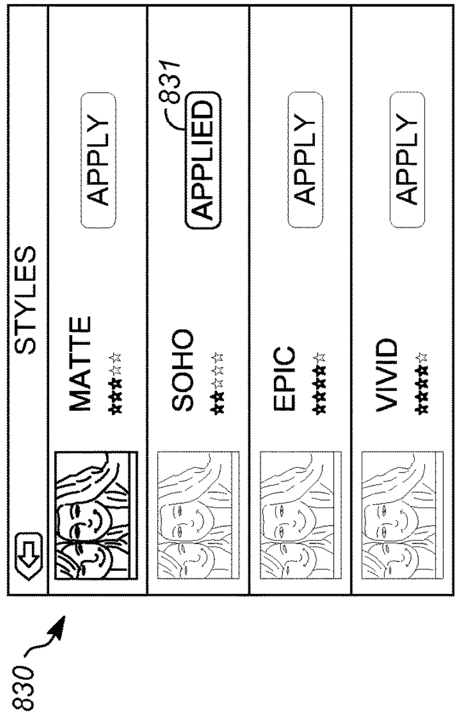
FIG. 8C
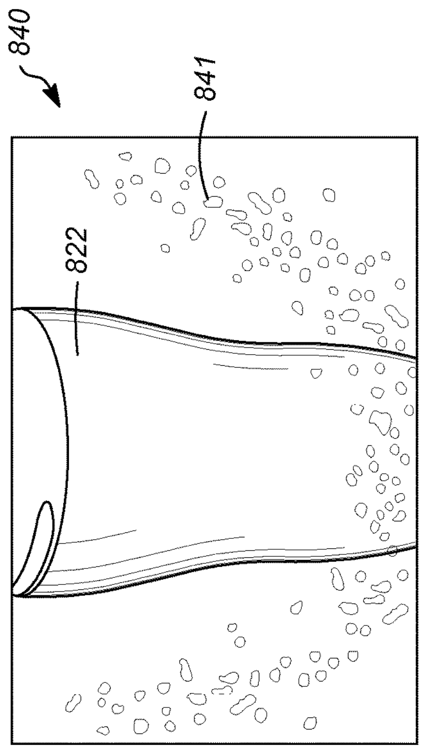
FIG. 8D

1120

1430

EDIT

1431

SCORE: 12 v 9

1440

1422

EDIT

1441

SCORE: 12 v 9

1450

EDIT

1451

1461 1462 1463 1464 1465

COMPUTERIZED SYSTEM AND METHOD FOR AUTHORING, EDITING, AND DELIVERING AN INTERACTIVE SOCIAL MEDIA VIDEO

CROSS-REFERENCE TO RELATED DOCUMENT

This nonprovisional application claims priority to U.S. Provisional Application 61/649,916 filed on May, 21, 2012, the entire contents of which are incorporated herein by reference for all purposes.

BACKGROUND

1. Field

The present disclosure relates generally to social media blogs, and more specifically, to authoring, archiving, and/or delivering social media video blogs.

2. Description of Related Art

Conventional social media technologies allow for the authoring of visual content by one content author and for the consumption of that authored content by a large number of viewers. For instance, video and image hosting websites such as YOUTUBE and FLICKR allow content to be uploaded once and viewed many times. Conventional social media technologies may, however, not provide content authors with tools that promote creativity and improve the aesthetic qualities of user-authored videos. Conventional social media technologies also may not provide viewers of authored videos with tools for interacting with and/or changing the authored content.

DESCRIPTION OF THE FIGURES

FIGS. 2A-2F depict an exemplary viewing of a Social Media Video.

FIGS. 4A-4E depict an exemplary Social Media Video.

FIGS. 8A-8D depict exemplary applications of style profiles to Social Media Videos.

DETAILED DESCRIPTION

Figure 1:
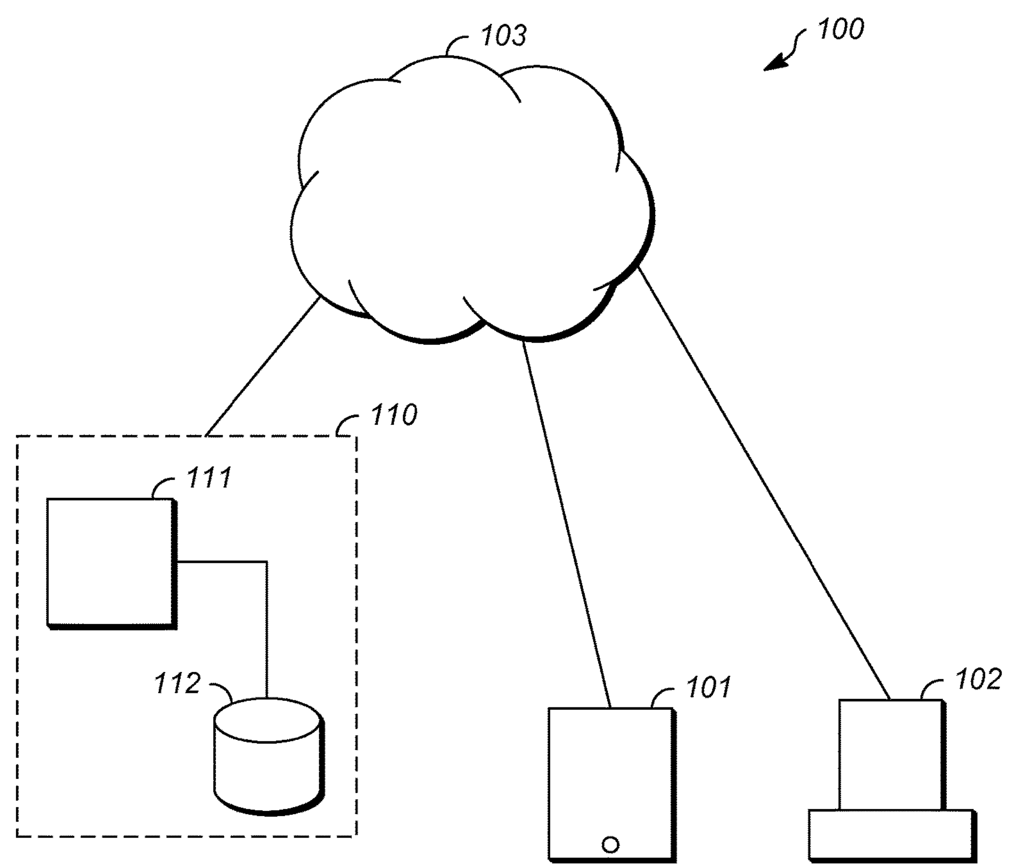
FIG. 1 depicts an exemplary Social Media Video system.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The embodiments described herein include technologies directed to the blogging of interactive videos in the social media ("Social Media Video"). A user creates a Social Media Video using media assets. Media assets may be visual or aural digital objects, such as images, video clips, audio clips, text verbiages, or the like. Media assets may be obtained from a location that is local to the computing device on which the Social Media Video is being created. For example, the internal memory of a camera-equipped cellular phone may act as a media asset feed. Media assets may also be retrieved from a location that is accessible via the internet, such as a social media website. In addition, during the creation process, a user may choose from style profiles that automatically affect the aesthetic qualities of the Social Media Video that is being created. In this way, users who are untrained in movie-making can produce high quality Social Media Videos conveniently, using computing devices such as mobile phones.

A Social Media Video may be shared with other users. A shared Social Media Video may be viewed, and optionally, may be "revised." During the revision process, the shared Social Media video is used as a starting point for the creation of a new Social Media Video. The new Social Media Video (i.e., the "revised" Social Media Video) may reference media assets that are part of the shared Social Media Video. Further, media assets may be added to and/or removed from the new (i.e., revised) Social Media Video. Further still, a different style profile may be applied to the new (i.e., revised) Social Media Video. The new (i.e., revised) Social Media Video may be shared with other users. In this way, users can collaborate to create, critique (including voting and/or commenting), and iterate Social Media Videos by leveraging previous iterations of the Social Media Videos.

The backend components of Social Media Videos are structured so that the layout and content of a Social Media Video may be changed repeatedly (whether during the initial creation process or the subsequent revision process) without requiring that the Social Media Video be rendered at the time of the change. Rather, the rendering of a Social Media Video, which may be computationally expensive, can be deferred until the Social Media Video becomes ready for viewing, meaning at the time when a user makes the Social Media Video available for viewing by other users. Preferably, the rendering of a Social Media Video is deferred to occur just-in-time for viewing, meaning at the time when a user requests to view a Social Media Video that has been made available. The backend components of Social Media Videos also allow media assets to be referenced repeatedly by one or more Social Media Videos without having to create multiple copies of the same media assets. Thus, Social Media Videos may be created using a variety of computing devices, including mobile computing devices that operate over networks of relatively limited bandwidth.

FIG. 1 illustrates an exemplary Social Media Video system 100 that supports the authoring, archiving, and/or delivering of Social Media Videos. Exemplary Social Media Video system 100 includes Social Media Video service provider 110, which may include server 111 and database 112 for storing Social Media Videos and related data. Social Media service provider 110 is connected to cloud network 103. Mobile computing device 101 and computer 102 are connected to Social Media Video service provider 110 via cloud network 103. Mobile computing device 101 may be a cellular phone (e.g., a smartphone) or a tablet computer, for example. Computer 102 may be a laptop or a desktop computer, for example. One or more of Social Media Video service provider 110 (e.g., server 111), mobile computing device 101, and computer 102 may have computer-executable instructions for creating, viewing, and/or revising Social Media Videos and their related data. Cloud network 103 may include portions of the internet, a public network, a private network, or a combination thereof.

1. Viewing a Social Media Video

In one embodiment, a native application that operates on a computing device includes computer-executable instructions for creating, viewing, and/or revising Social Media Videos. For example, the native application may be an APPLE iOS "app" or a GOOGLE ANDROID "application" or "widget".

FIG. 2A illustrates an exemplary viewing of a Social Media Video on a computing device that is local to a user in the present embodiment. Social Media Videos 201-202 are displayed on screen 200, and are available for viewing. One or more media assets associated with Social Media Videos 201-202 may be stored at a Social Media Video service provider. If a user selects video 201 for viewing, the media assets that are associated with Social Media Video 201 are obtained, by the local computing device, from the Social Media Video service provider. The media assets to be obtained may include images, video clips, audio clips, text verbiages, or the like. Once obtained, the media assets are converted, by the local computing device, into visual and aural information for presentation to the user. Preferably, the presentation includes sufficient visual movement and is presented at a sufficient frame rate to be perceived by a human viewer (i.e., the user) as a video, instead of a slideshow of still images.

FIGS. 2B-2E illustrates an exemplary viewing of video 201. Social Media Video 201 begins with a display of text 211 indicating that the topic of video 201 is a volleyball game. After a while, the view transitions to a display of text 221 overlaid onto image 222 in its original form. After a while, the view further transitions to a display of video clip 231. The viewing of video 201 concludes with a display of visually enhanced image 241. Visually enhanced image 241 may be, for example, a color image that is converted and displayed in black and white, while other media assets of Social Media Video 201 are displayed in their native (e.g., color) form. The viewing of video 201 may be accompanied by audio. After the viewing of Social Media Video 201, the user is given the option to revise Social Media Video 201 by selecting button 251. The revision of a Social Media Video is discussed in a separate section, below.

Figure 3:
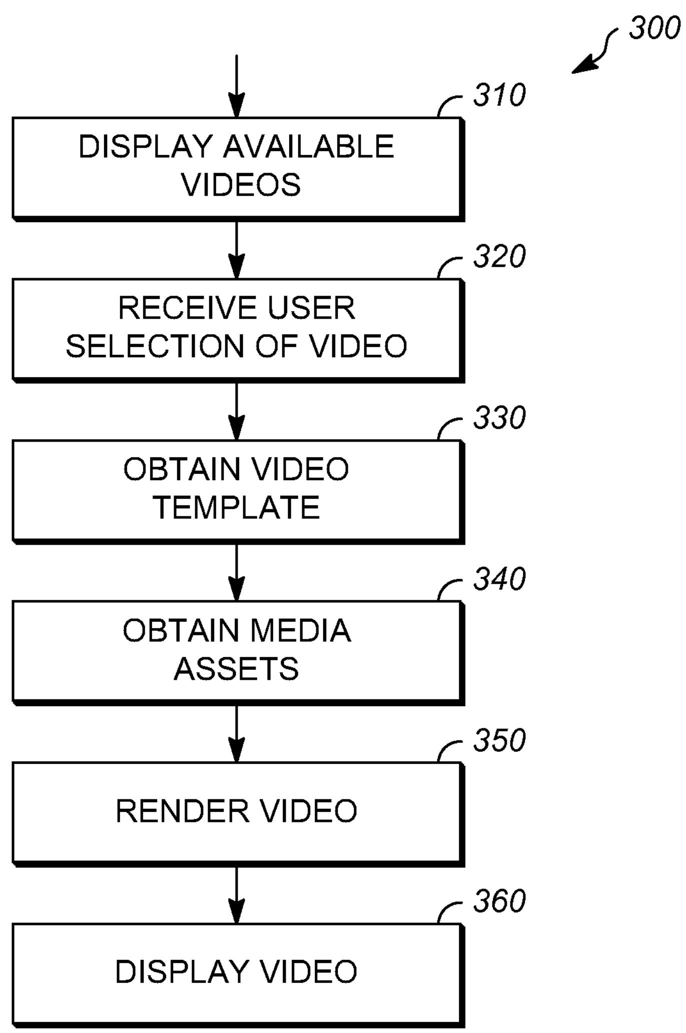
FIG. 3 depicts a block diagram of an exemplary process for Social Media Video viewing.

FIG. 3 illustrates exemplary process 300 that may be carried out to view a Social Media Video as described above with reference to FIGS. 2A-2F. At block 310, images that represent Social Media Videos that are available for viewing are displayed on a display screen. In order to display these representative images on screen 200 (FIG. 2A), media assets that do not yet reside on the local computing device are obtained from the Social Media Video service provider. Media assets that have been obtained are stored and/or cached on the local computing device. In some cases, only a portion of a media asset is needed to support the display of a representative image. For example, if the initial portion of a particular Social Media Video is itself a video clip, a frame of the video clip can be obtained for purposes of display at block 310.

At block 320, a user's selection of one of the available Social Media Videos is received via a user input. The user input may be a tap or a click on the image associated with the Social Media Video. At block 330, a template that defines the selected Social Media Video is obtained by the local computing device from the Social Media Video service provider. The template includes meta-data and data. The template meta-data identifies media assets that are part of the Social Media Video. For example, the template meta-data may reference images, video clips, and/or audio clips that are stored at the Social Media Video service provider. The template data provides information that is used to render the Social Media Video for viewing. For example, the data may include a default order in which the media assets of the Social Media Video are to be displayed. The default order may have been defined by a user, a local computing device, and/or a combination of the two. The template data may also include text verbiages that are to be displayed together with media assets.

At block 340, the referenced media assets are obtained, as necessary, by the local computing device from the Social Media Video service provider. Media assets that do not yet reside on the local computing device are obtained from the Social Media Video service provider. Media assets that have been obtained previously and are currently stored (and/or cached) on the local computing device do not need to be obtained again. At block 350, a rendering process uses the template and the obtained media assets to produce a visual (and optionally aural) presentation of the Social Media Video. At block 360, the rendered information is displayed for viewing on a display screen.

Optionally, during the viewing of a Social Media Video, a user may control the portion of the Social Media Video that is displayed via swipe gestures. For instance, during the display of a particular media asset ("the current media asset"), a user may swipe horizontally to the right. In response to this swipe gesture, the display switches to the media asset that was displayed immediately prior to the current media asset. A user may also swipe horizontally to the left. In response to this swipe gesture, the display switches immediately to the next media asset that is to be displayed according to the default order.

2. Creating a Social Media Video

The creation of a Social Media Video is discussed below with reference to FIGS. 4A-4E. As shown in FIGS. 4A-4E, create button 401 may be selected by a user to begin the creation process. In response to the user's selection of create button 401, editing view 410 is displayed. In the present embodiment, editing view 410 comprises three regions. A top region, called the "media carousel" (411), displays thumbnail versions of media assets that are available for inclusion into a Social Media Video. A middle region, called the "timeline" (412), displays the contents of the Social Media Video that is being created. The contents of a Social Media Video are media assets. Thumbnail versions of media assets are displayed in the timeline. The ordering of thumbnails on the timeline corresponds to the order in which the corresponding media assets are to be displayed during a viewing of the Social Media Video. For example, given two adjacent media thumbnails assets on the timeline, the media asset represented by the thumbnail to the left is displayed immediately before the media asset represented by the thumbnail to the right. A bottom region (413) of editing view 410 includes options for further configuring a Social Media Video. The three regions of editing view 410 are discussed in more detail, below.

Figure 4B:
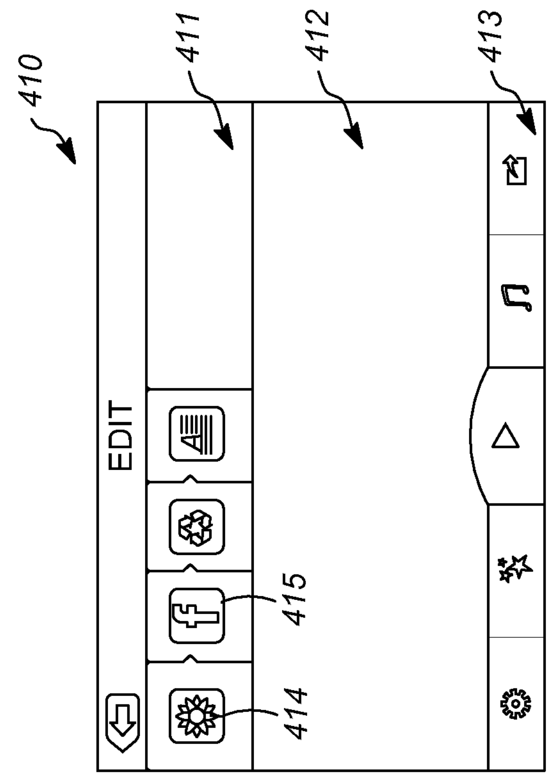
Figure 4A:
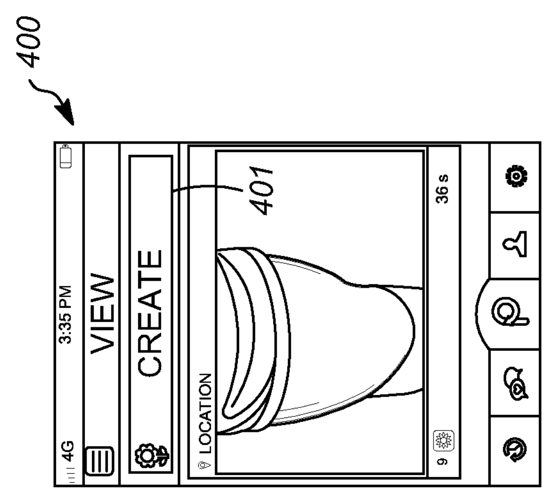

Media carousel 411 (i.e., the top region) of editing view 410 is discussed with reference to FIGS. 4B-4E. As shown in FIG. 4B, the media carousel comprises icons that each represents a media asset feed. In the present embodiment, media assets feeds include the memory of the computing device that is local to the user. For example, the local device may be integrated with a camera having memory that stores photos and video clips. Exemplary media asset feed icon 414 may thus refer to the camera memory storage of the local computing device. Media asset feeds also include third party websites. For example, social media websites such as FACEBOOK may provide images and video clips. Exemplary media asset feed icon 415 may thus refer to FACEBOOK, and more specifically, to albums that are accessible to a FACEBOOK account. Access to albums may depend on a social graph of the FACEBOOK account. When a media asset feed icon is selected, thumbnail versions of media assets that are available from the corresponding media asset feed are displayed in media carousel 411 of editing view 410.

A media asset that is represented by a thumbnail in media carousel 411 may be added to timeline 412 by way of user input as discussed below. First, a user selects a media asset feed by way of, for example, a tap. FIG. 4C illustrates the selection of media asset feed 414 (i.e., camera memory storage), which causes thumbnail versions of media assets that are available from media asset feed 414 to be displayed in media carousel 411. Second, the user provides a downward swipe gesture to indicate the addition of a represented media asset from the media carousel to the timeline of a Social Media Video. As shown in FIG. 4C by block arrow 423, the downward swipe gesture begins from media asset thumbnail 421 (in media carousel 411) and proceeds towards timeline 412. In this way, the media asset represented by exemplary media asset thumbnail 421 is added to timeline 412 of the Social Media Video that is being created. FIG. 4D further illustrates the addition of media asset 431, which correspond to media asset thumbnail 421 of FIG. 4C, into timeline 412. FIG. 4E illustrates the addition of other media assets, such as image 442 represented by media asset thumbnail 441 (FIG. 4E), into timeline 412 via additional downward swipes. Note, other media assets, such as video clips, may be added to timeline 412 in this way.

Figure 5B:
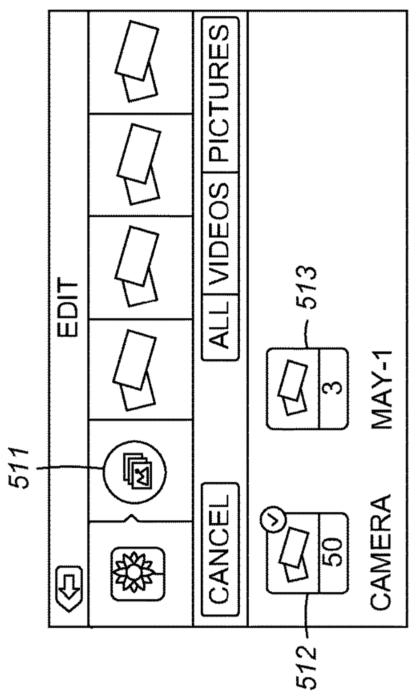
FIGS. 5A-5D depict an exemplary user interface for creating a Social Media Video.
Figure 5D:
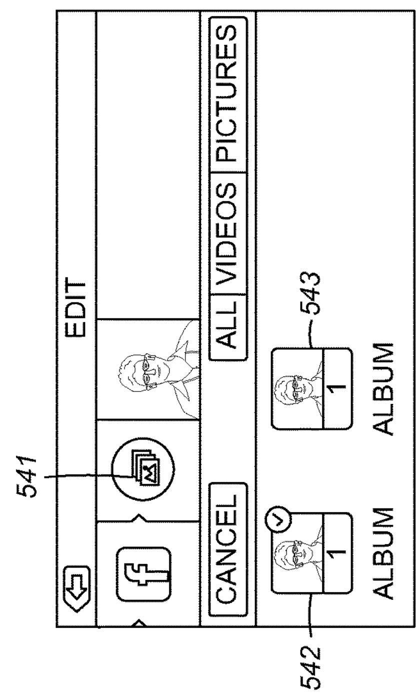
Figure 5A:
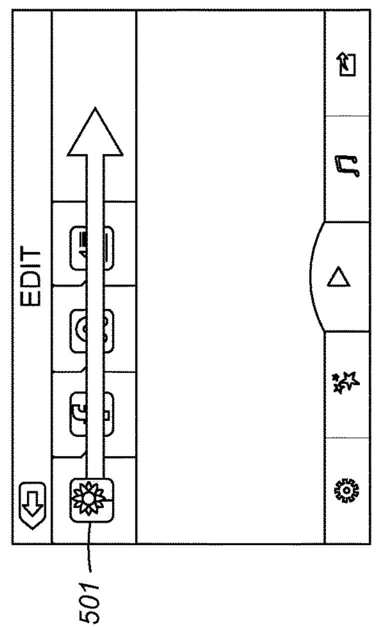

A media asset feed may provide multiple media assets, thus, it is advantageous to present media assets in an organized manner. Functionalities related to the organization of media assets in the media carousel are discussed with reference to FIGS. 5A-5D. A media asset feed may use folders, albums, and/or other hierarchical structures to categorize media assets. The media carousel supports user navigation of these structures. For example, a camera-equipped cellular phone may organize images and/or video clips in its camera memory storage using folders. As shown in FIGS. 5A-5B, media asset feed icon 501, which represents the camera memory storage of a local computing device, can be swiped horizontally to the right, resulting in the display of folder selection icon 511. Folder selection icon 511 may be selected by a user. When selected, folders 512 and 513 from the camera memory storage are displayed for further folder navigation. When a folder icon is selected, media assets within the corresponding folder are displayed in the media carousel for selection by a user.

Figure 5C:
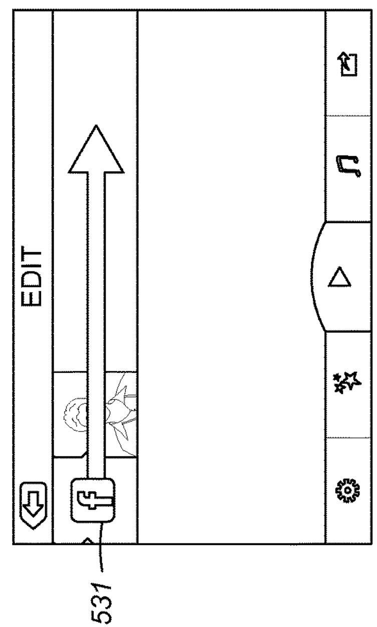

In similar fashion, a social media website, such as FACEBOOK, may organized organize media assets using albums. The media carousel allows user navigation of these structures of social media websites. As shown in FIGS. 5C-5D, media asset feed icon 531, which represents a FACEBOOK account, can be swiped horizontally to the right, resulting in the display of album selection icon 541. Album selection icon 541 may be selected by a user. When selected, albums 542 and 543, which are associated the FACEBOOK account of media asset feed icon 531, are displayed for further album navigation. When an album icon is selected, media assets within the corresponding album are displayed in the media carousel for selection by a user. Optionally, to conserve network resources, thumbnail versions of media assets that are available at a media asset feed may be obtained instead of the actual, larger media assets.

Figure 6A:
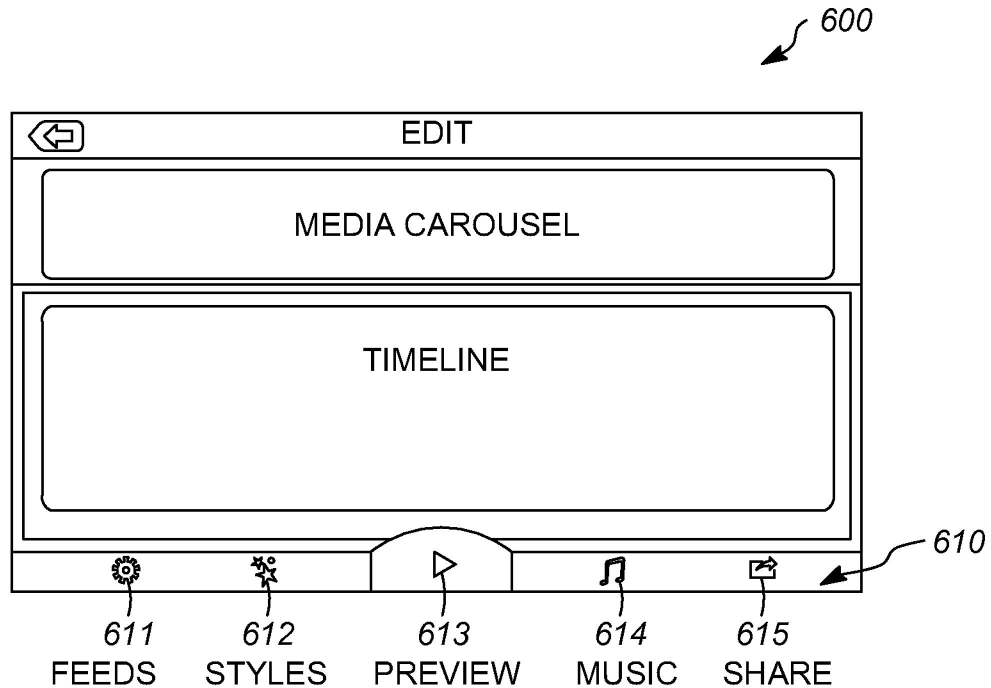
FIGS. 6A-6B depict an exemplary user interface for creating a Social Media Video.
Figure 6B:
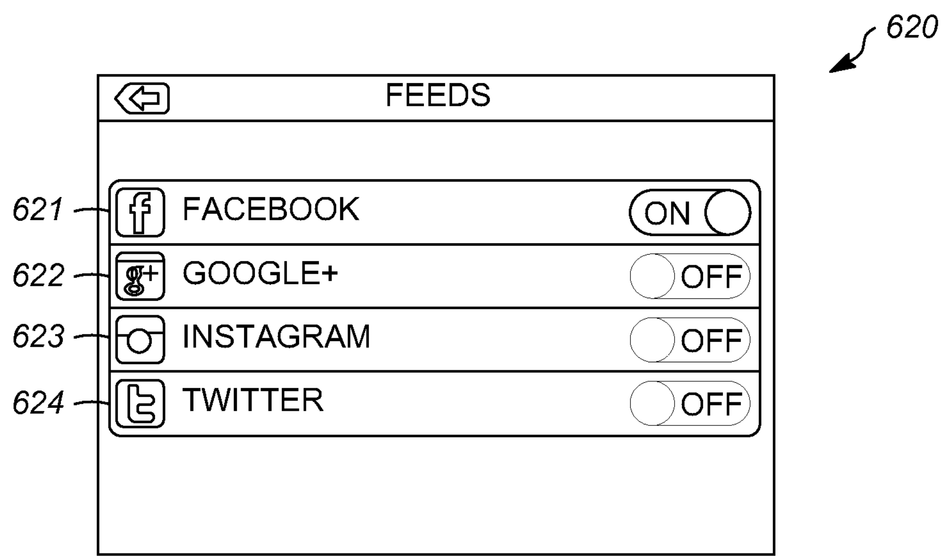

Bottom region 413 of editing view 410 (FIG. 4B) includes options for further configuring a Social Media Video, and is discussed with reference to FIGS. 6A-6B. As shown in FIG. 6A, editing view 600 includes bottom region 610, which in turn includes buttons 611-615 for configuring a Social Media Video. A user may select button 611 for configuring media asset feeds. Screen 620 for configuring media asset sources is displayed when a user selects button 611. As shown in FIG. 6B, screen 620 includes selectors 621-624 for controlling whether corresponding media asset sources are to be displayed in the media carousel (e.g., media asset feed icons 501 and 531 of FIG. 5A and FIG. 5C.) Although not shown, additional fields may allow for the input of authentication credentials (e.g., profile name and/or password) to particular media asset feeds.

Figure 7A:
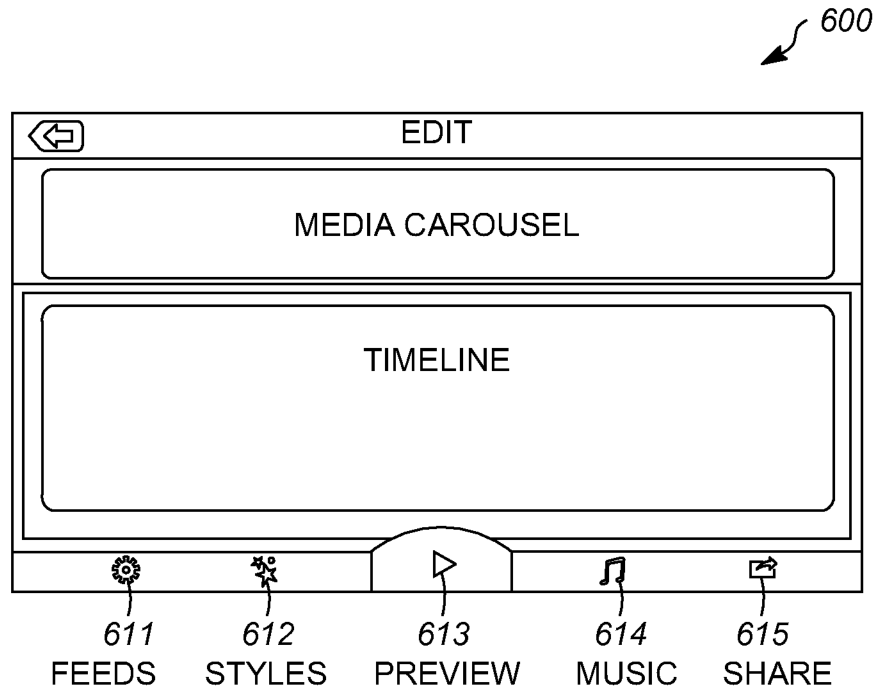
FIGS. 7A-7B depict an exemplary user interface for creating a Social Media Video.
Figure 7B:
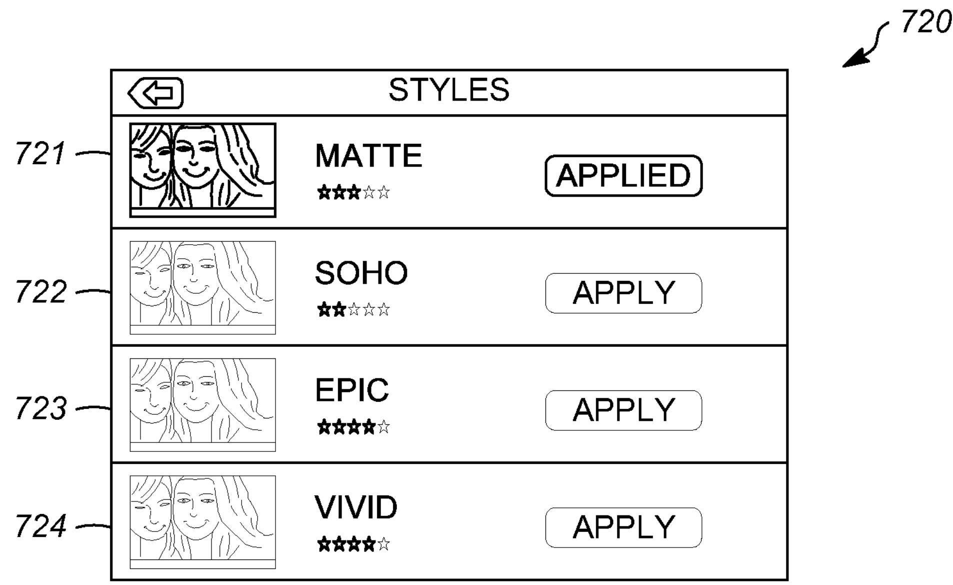

FIG. 7A illustrates button 612 for applying a style profile ("style") to a Social Media Video. The selection of a style profile affects the visual and/or aural presentation of a Social Media Video. For one, the selection of a style profile may cause an audio clip and/or other sound effect to be played during the viewing of a Social Media Video. For another, the selection of a style profile may affect the visual presentation of a Social Media Video. Visual effects can affect the display of individual media assets. For example, a style profile can affect the color palette, hue, contrast, brightness, focus (e.g., blurring), boundaries (e.g., cropping, bordering), or the like, of the display of a media asset. A style profile can also affect the font face and style of the display of text verbiages in a Social Media Video. Visual effects can affect the overall presentation of a Social Media Video. For example, a style profile can affect the display durations of media assets, methods of transition between displayed media assets, timings of transitions, or the like. A style profile can also affect the camera movement (e.g., pan, zoom), camera perspective (i.e., viewpoint), aspect ratio, or the like, of the display of a Social Media Video. Further, the selection of a style profile may cause visual elements to be added to a Social Media Video. For example, snowflakes and star dust can be overlaid onto certain media assets of a Social Media Video. Text verbiages (including user commentaries) can also be added onto the media assets of a Social Media Video. FIG. 7B illustrates the display of exemplary style profiles 721-724, which are displayed in response to a user's selection of style button 612 (FIG. 7A).

FIGS. 8A-8D illustrate exemplary applications of style profiles to a Social Media Video. As shown, in FIG. 8A, exemplary "matte" style profile 811 is selected. FIG. 8B illustrates the viewing of an exemplary Social Media Video having media asset 822 (an image of a coffee cup) using the "matte" style profile. As shown, the selection of "matte" style 811 causes border 821 to be added to the display of media asset 822. Also, although not shown, media asset 822 is displayed with a matte finish. FIGS. 8C-8D illustrate the use of exemplary "soho" style 831. The selection of "soho" 831 style profile causes the display of media asset 822 to include overlaid visual effects in the form of magic dust 841. Also, although not shown, media asset 822 is displayed out of focus and with a glossy finish.

The association of a style profile with a Social Media Video is maintained in the template that defines the Social Media Video. Although the selection of a style profile affects the display of a Social Media Video, the changes are not made immediately at the time of style profile selection. That is to say that, for example, media asset 822 is not converted immediately upon the selection of the "matte" or "soho" style profiles as discussed above. Rather, in the present embodiment, changes to the media assets of a Social Media Video due to the selection of a style profile occur just-in-time before the Social Media Video is to be viewed. Changes to the presentation of media assets are determined by a rendering process that is carried out on the local computing device on which the viewing is to occur. This just-in-time rendering allows users to repeatedly change style profiles and to see the resulting changes without having to wait for the changes to be applied to the entirety of the Social Media Video first. Further, this just-in-time rendering also allows users to view or preview a Social Media Video without having to transmit the media assets of the Social Media Video to a Social Media Video service provider for rendering and to download the rendered results before viewing.

Further still, this just-in-time rendering allows for the bifurcated maintenance of style profiles between a Social Media Video service provider and its user base. Specifically, the maintenance of style profiles is bifurcated in that a Social Media Video service provider can change, from time to time, the availability and effects of certain style profiles. Likewise, users may also change, from time to time, the association between Social Media Videos and style profiles. The just-in-time application of style profiles to Social Media Videos allows the most up-to-date effects of a selected style profile to be determined at the time of viewing. Thus, a user is provided with the most up-to-date presentation of a Social Media Video.

Figure 9A:
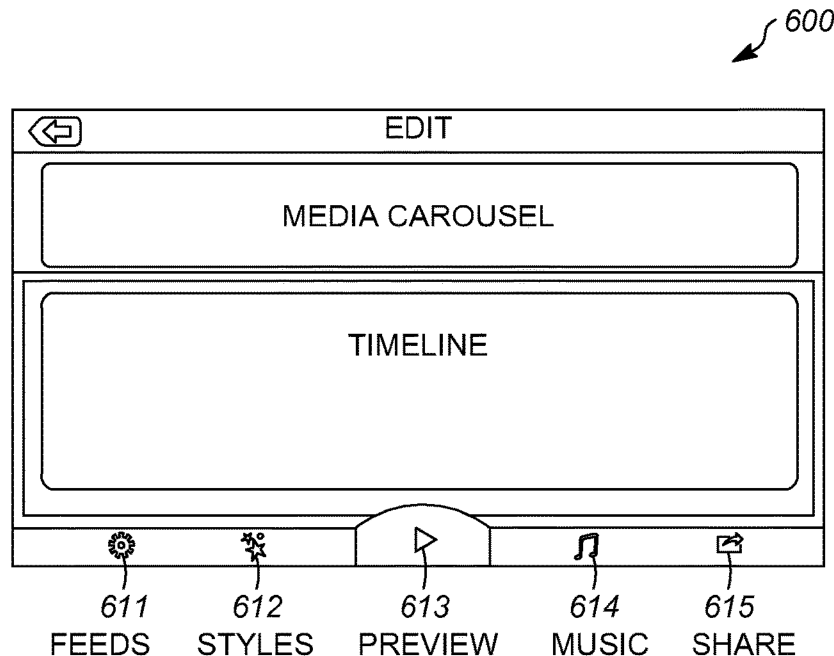
FIGS. 9A-9B depict an exemplary user interface for creating a Social Media Video.
Figure 9B:
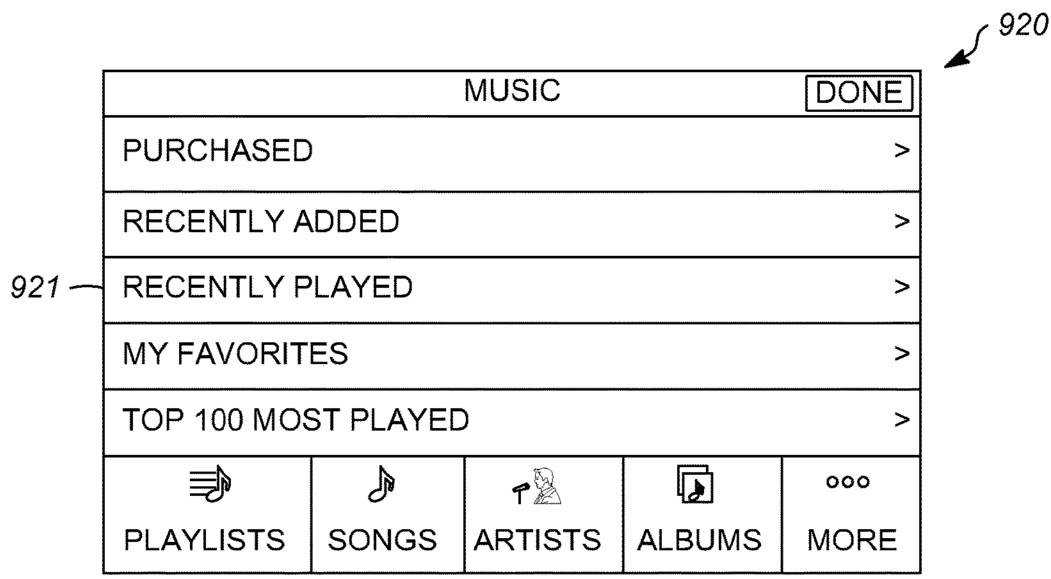

FIG. 9A illustrates button 614 for selecting audio clips to be played during the viewing of a Social Media Video. FIG. 9B illustrates screen 920 for selecting an audio clip. Screen 920 is displayed when a user selects button 614. No restriction is placed on the source of audio content. In the present embodiment, a local computing device may include a library of audio clips. For example, user interface 921 is the user interface of an APPLE music player. In some embodiments, a local computing device may obtain audio clips from a Social Media Video service provider for use with Social Media Videos.

Figure 10B:
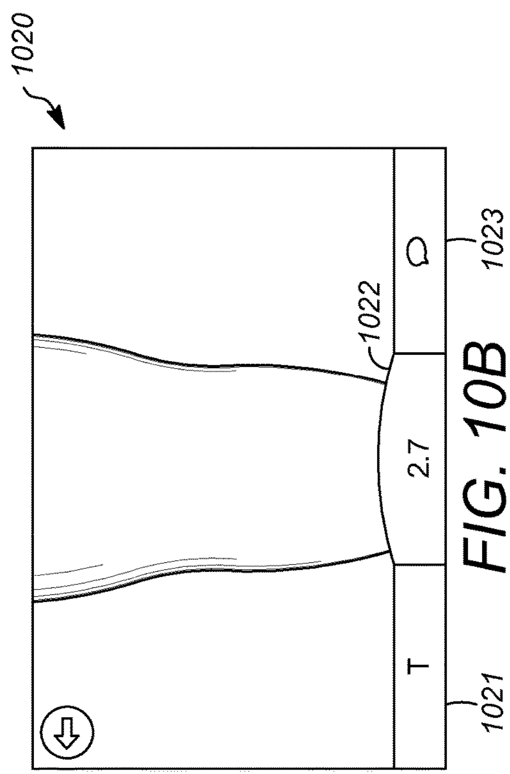
FIGS. 10A-10D depict an exemplary user interface for creating a Social Media Video.
Figure 10C:
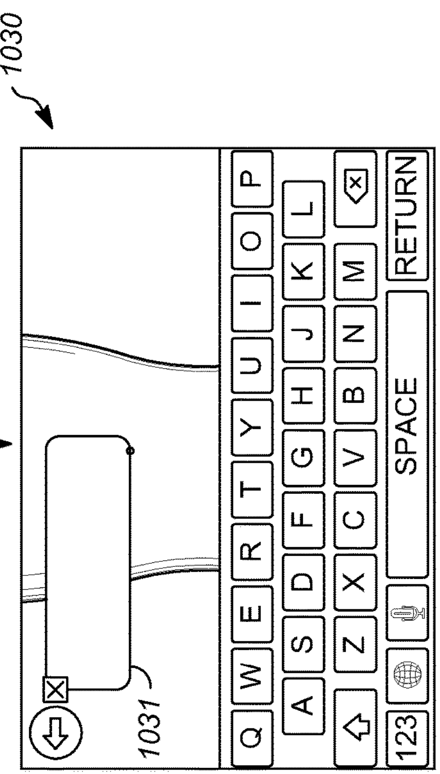
Figure 10A:
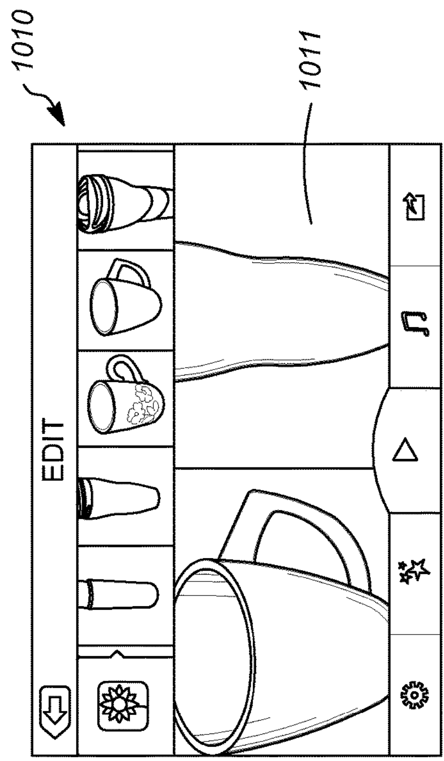
Figure 10D:
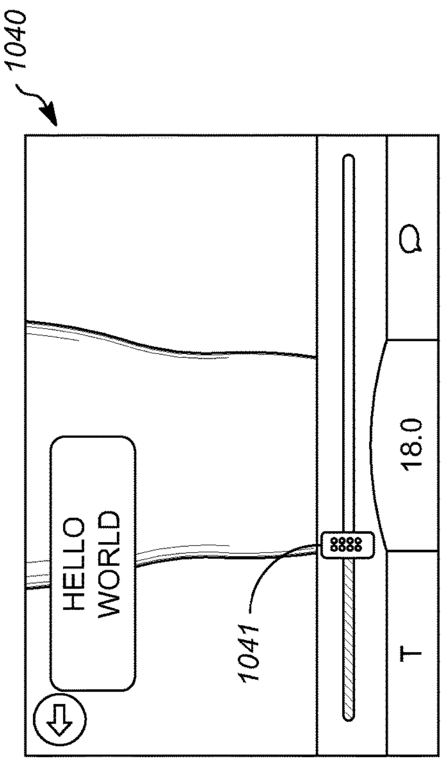

FIGS. 10A-10D illustrate additional functions provided by editing view 1010. As shown in FIG. 10A, the timeline of editing view 1010 includes media asset 1011. A user may tap on media asset 1011 to invoke screen 1020. Screen 1020 includes buttons 1021 for adding a text overlay to media asset 1011. Screen 1030 illustrates the addition of overlay text in region 1031 via button 1021. A user may tap on button 1022 to invoke screen 1040. Screen 1040 illustrates slider 1041 for configuring the display duration of a media asset, such as media asset 1011.

Figures 11A, 11B:
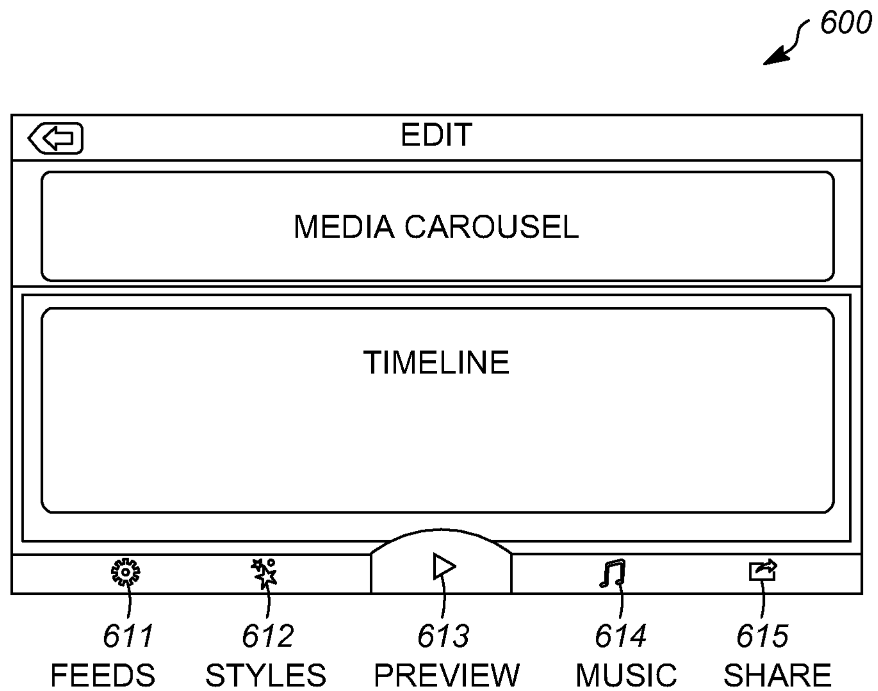
FIGS. 11A-11B depict an exemplary user interface for previewing a Social Media Video.

A user may preview a Social Media Video during the creation of a Social Media Video. FIG. 11A illustrates button 613 for previewing a Social Media Video that is being created. In the present embodiment, in response to a user's instruction to preview a Social Media Video, the local computing device obtains, from media asset feeds, those media assets that are included in the Social Media Video being created. The obtained media assets are rendered according to the current style profile selection (if one is selected), and are displayed, as a video, according to the ordering and configuration of media assets as specified via the timeline corresponding to the Social Media Video. FIG. 11B illustrates the exemplary preview of a Social Media Video, which includes an image of a coffee cup, on screen 1120.

Figure 12A:
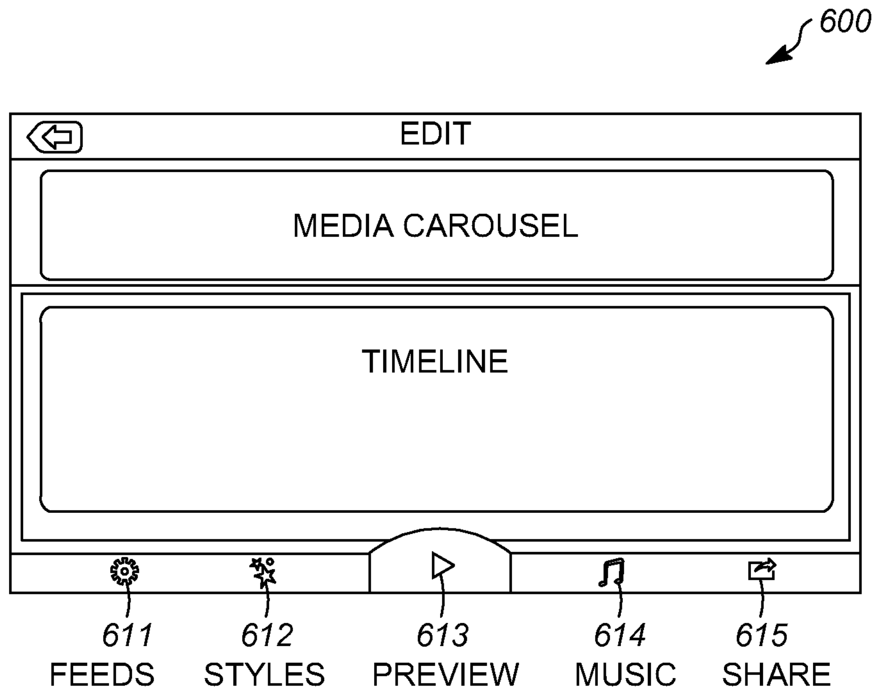
FIGS. 12A-12B depict an exemplary user interface for creating a Social Media Video.
Figure 12B:
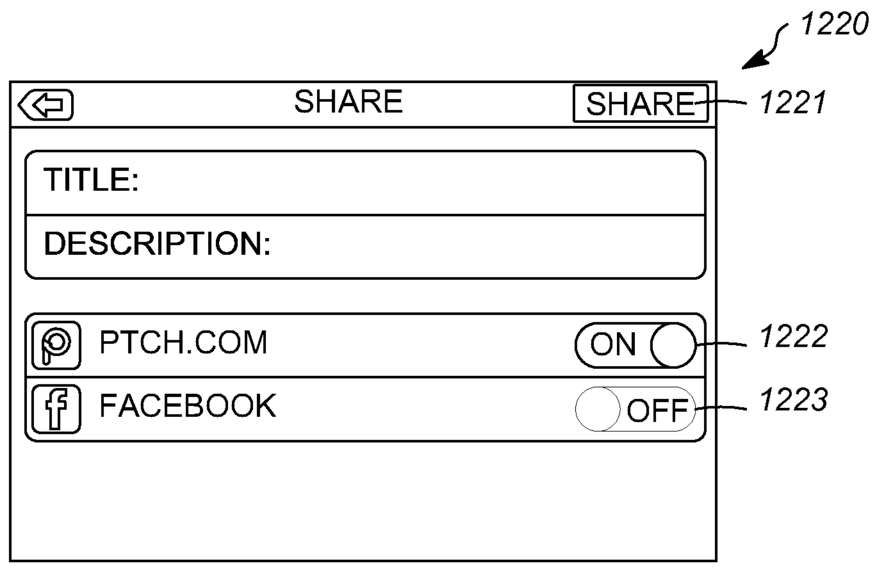

If the preview of a Social Media Video is unsatisfactory, the user may wish to return to editing view 1010 (FIG. 10A) to make changes to the Social Media Video. If the preview of the Social Media Video is satisfactory, the user may wish to share the Social Media Video with other users by publishing the Social Media Video. FIG. 12A illustrates button 615 for sharing a Social Media Video. As shown in FIG. 12B, a title and/or description may be assigned to the Social Media Video that is being shared. In the present embodiment, a shared Social Media Video is made available to other users via a native application. The user may also specify additional mechanisms by which the Social Media Video is to be shared with other users. For example, selector 1222 allows a user share a Social Media Video via a website that is hosted by a Social Media Video service provider. Selector 1223 allows a user to share a Social Media Video via a third-party website, such as the FACEBOOK social media website. When a Social Media Video is shared via a third-party website, the website may provide a web page that includes a region for displaying the Social Media Video. Certain techniques may be used to include, into a web page that is served by a third-party website, content from another content provider. For example, FACEBOOK allows for the inclusion, into a FACEBOOK web page, of non-FACEBOOK content through the use of JavaScript, CSS, and/or HTML technologies. The non-FACEBOOK content may include a Social Media Video player that is provided by a Social Media Video service provider for the viewing of Social Media Videos.

Figure 13:
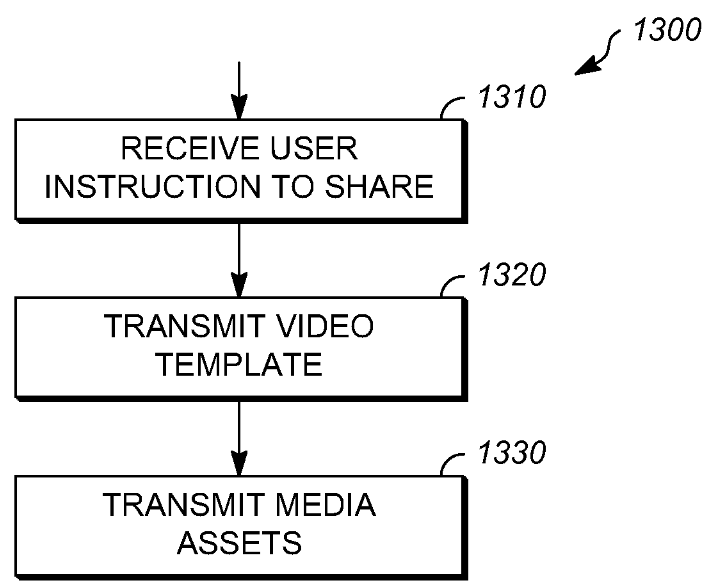
FIG. 13 depicts a block diagram of an exemplary process for sharing a Social Media Video.

FIG. 13 illustrates exemplary process 1300 that may be used to share a Social Media Video as discussed with respect to FIGS. 12A-12B. At block 1310, a user instruction to share a Social Media Video is received. At block 1320, a template that defines the Social Media Video is transmitted by the local computing device to the Social Media Video service provider. As discussed above, the template of a Social Media Video includes metadata and data that controls what media assets and how the media assets are to be displayed. The transmission of a template (that defines a Social Media Video) should not be confused with the selection of a style profile. The metadata and/or data contained in a template may reference a style profile that has been selected by a user, but the term "template" does not mean "style profile".

At block 1330, media assets that reside at the local computing device, but do not yet reside at the Social Media Video service provider, are transmitted from the local computing device to the Social Media Video service provider. Similarly, media assets that reside at a media asset feed (e.g., a social media website), but do not yet reside at the Social Media Video service provider, are also transmitted to the Social Media Video service provider. The transmission of media assets from a media asset feed to a Social Media Video service provider may occur in two ways. First, the local computing device may obtain a media asset from the media asset feed, and subsequently transmit the media asset to the Social Media Video service provider. Second, the local computing device may instruct the Social Media Video service provider to obtain media assets from the media asset feed. The storage of media assets on the Social Media Video service provider preserves media assets for use with Social Media Videos, even if the original copies of the media asset (e.g., on the local device or at a media asset feed) become unavailable. Once the template and media assets of a Social Media Video are transmitted to the Social Media Video service provider, the Social Media Video may become available for viewing by other users.

4. Revision of Social Media Video

As discussed above, a user may "revise" an existing Social Media Video. The "revision" of a Social Media Video is discussed with reference to FIGS. 14A-14F. As shown, screen 1400 includes revise button 1401. In response to a user's selection of revise button 1401, editing screen 1410 is displayed. The timeline of editing screen 1410 is pre-populated with thumbnail versions of the media assets of the Social Media Video that is being revised.

Figures 14A, 14B, 14C, 14D, 14E, 14F:
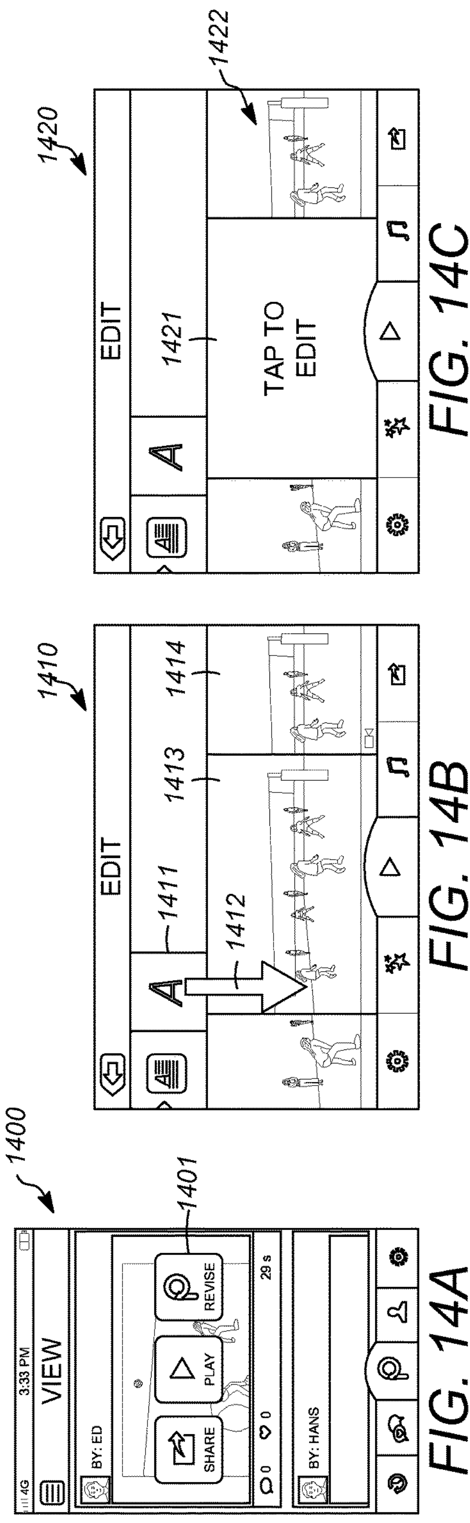
FIGS. 14A-14F depict an exemplary user interface for revising a Social Media Video.

During the revision process, a user may add media assets into the timeline of a Social Media Video. FIG. 14B illustrates an exemplary addition of text verbiage by way of the downward swipe gesture indicated by block arrow 1412. As shown, the downward swipe begins at text verbiage icon 1411 of the media carousel and ends at the timeline of editing view 1410. FIG. 14C illustrates the addition of text verbiage 1421 into timeline 1422. A user may tap on text verbiage 1421 to edit the text that is to be displayed. FIG. 14D illustrates the updated text verbiage 1431, which includes the score of the volleyball game that is being blogged.

During the revision process, a user may also delete media assets from the timeline of a Social Media Video. FIG. 14E illustrates an exemplary deletion of text verbiage 1421 by way of the upward swipe gesture indicated by block arrow 1441. As shown, the upward swipe begins at timeline 1422 and ends at the media carousel of editing view 1440. FIG. 14F illustrates the removal of text verbiage 1421 from timeline 1422, which may include the display of visual effect 1451.

In addition, as shown in FIG. 14F, during the revision process, button 1461 may be used to configure media asset feeds, button 1462 may be used to select a style profile, button 1463 may be used to preview the Social Media Video being revised, button 1464 may be used to associate an audio clip, and button 1465 may be used to share the Social Media Video.

5. Video Rendering

As one of ordinary skill in the art would appreciate, the term "video" is generally used to describe a visual stimulus that is perceived by a human viewer to be in motion. Conversely, an example of what is not considered to be a video is the static display of one still image. However, it should be noted that a video need not constantly show objects in motion in order for the video to be considered a video. Indeed, portions within a video can display still images, and changes in, for example, the camera perspective of the display of a still image can still impart video qualities to the display of stationary objects. For example, image 1413 (FIG. 14B), which is part of a Social Media Video, is a still image. However, the inclusion of image 1411 into a Social Media Video does not preclude the Social Media Video from being a video, at least because the viewing of the Social Media Video will include the display of, for example, other images, video clips, audio clips, and/or text that vary based on time. In addition, the camera perspective (i.e., viewpoint) used during the viewing of image 1411 can vary based on time.

The recording and display of a video is typically performed using "frames" that are displayed in rapid succession. A video frame contains a discrete portion of a video. Adjacent frames of a video typically contain visual information that are slightly different. The display of frames in a rapid manner would thus impart the appearance of motion to the human eye, thereby causing a human viewer to perceive the rapid display of frames as a video. Conventionally, frame rates of 24, 30, or more frames per second are used by artisans to record and create videos.

It has been determined that, in the context of Social Media Videos, frame rates of as low as 12 frames per second can provide a visual experience that is video-like to a human viewer. The particular frame rate that is used by process 300 (FIG. 3) during the viewing of a Social Media Video may vary from time to time. The use of a lower frame rate may conserve network resources because it reduces the amount of information that is required to be transferred between a local display device and a Social Media Video service provider to support the viewing of a video clip. The use of a lower frame rate may also conserve computing resources on the local computing device that is rendering a Social Media Video. Thus, it is advantageous to vary the frame rate at which a Social Media Video is displayed based on network conditions. It is also advantageous to vary the frame rate at which a Social Media Video is displayed based on existing loads on a local computing device.

Figure 15:
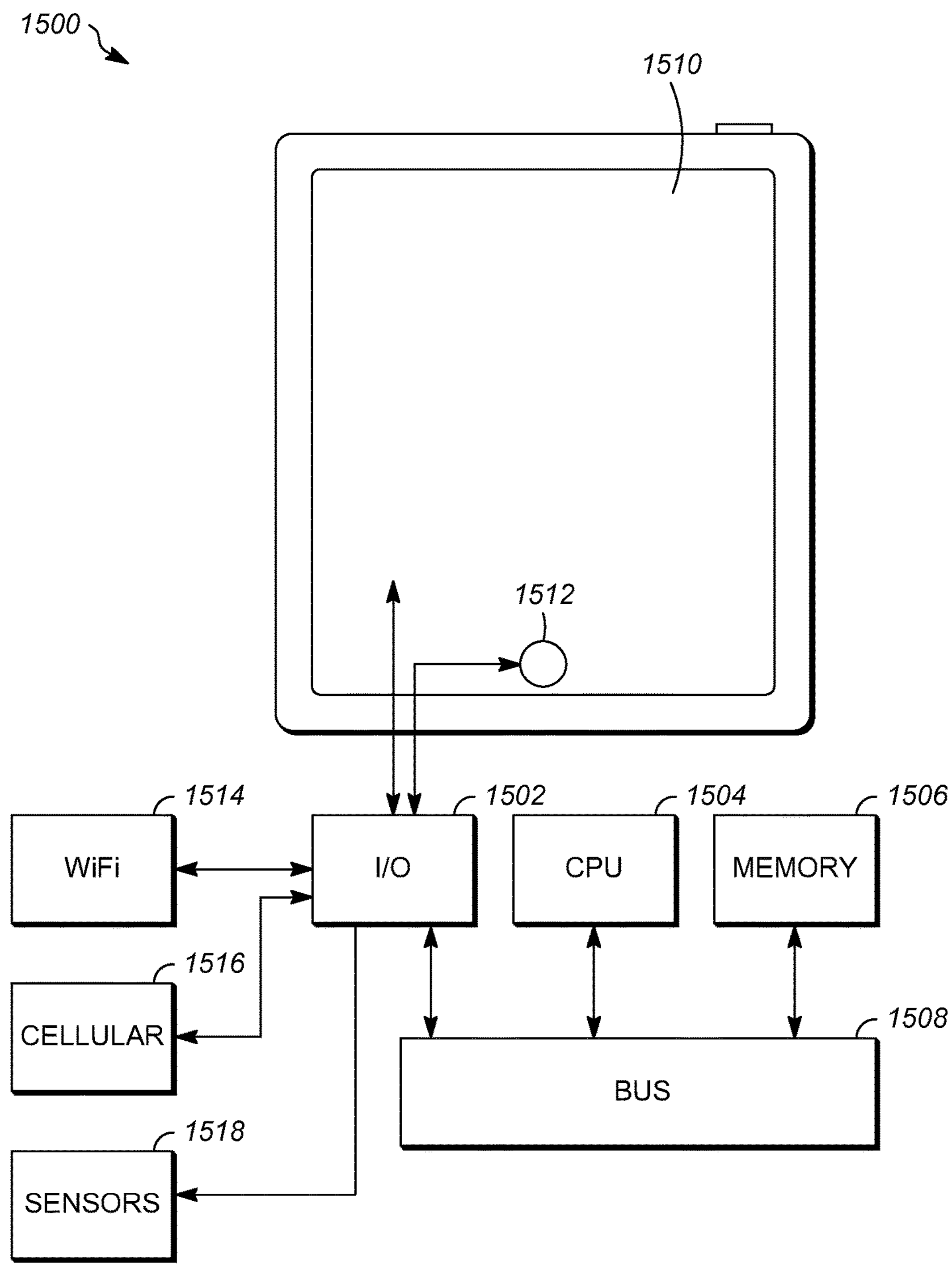
FIG. 15 depicts an exemplary computing system for performing Social Media Video processes.

Social Media Video processes 300 and 1300 described above may be implemented in exemplary computing system 1500. In the present exemplary embodiment, computing system 1500 may be a cellular phone and/or a tablet computer. In some embodiments, computing system 1500 is a desktop computer and/or a laptop computer. As shown in FIG. 15, computing system 1500 comprises a motherboard with bus 1508 that connects I/O section 1502, one or more central processing units (CPU) 1504, and a memory section 1506 together. Memory section 1506 may contain computer executable instructions and/or data for carrying out processes 300 and 1300. The I/O section 1502 may be connected to display 1510, input device 1512, which may be a touch-sensitive surface, one or more buttons, a keyboard, a mouse, or the like. I/O section 502 may also be connected to Wi-Fi unit 1514, cellular antenna 1516, and/or sensors 1518. Sensors 1518 may include a GPS sensor, a light sensor, a gyroscope, an accelerometer, or a combination thereof.

At least some values based on the results of the above-described processes can be saved into memory such as memory 1506 for subsequent use. Memory 1506 may be a computer-readable medium that stores (e.g., tangibly embodies) one or more computer programs for performing any one of the above-described processes by means of a computer. The computer program may be written, for example, in a general-purpose programming language (e.g., C including Objective C, Java, JavaScript including JSON, and/or HTML) or some specialized, application-specific language.

In some embodiments, a computing device running an operating platform that does not support just-in-time rendering of Social Media Videos may be used to view Social Media Videos that have been pre-rendered. For example, a user may log into a social media website to view Social Media Videos via a Social Media Video player. JavaScript, CSS, and/or HTML technologies may be used to include, into a web page that is served by one provider, content from another provider. For example, FACEBOOK allows for the inclusion, into a FACEBOOK webpage, of non-FACEBOOK content. The FACEBOOK content may be a Social Media Video player that is provided by a Social Media Video service provider for displaying Social Media Videos. Before a Social Media Video can be viewed via a Social Media Video player, the Social Media Video services provider pre-renders the Social Media Video and transmits the pre-rendered Social Media Video to the Social Media Video player. Portions of process 300 may be used to pre-render a Social Media Video for viewing in a Social Media Video player. Pre-rendering is useful for compatibility with operating platforms that do not yet support just-in-time rendering of Social Media Videos.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this technology.

What is claimed is:

1. A computer-implemented method comprising:

receiving, by a computing device from a social media web server, a first social media template, wherein the first social media template comprises:

a first metadata identifying a plurality of media objects, and a first data representing a first display order in which the plurality of media objects are to be displayed;

receiving, by the computing device, an input from a user to begin a revision process;

obtaining, by the computing device, the plurality of media objects identified by the first metadata of the first social media template;

receiving a first input from the user during the revision process, wherein:

the first input represents removal of a media object from the plurality of media objects, and the first input further represents a second display order different from the first display order;

creating, by the computing device, a second social media template, the second social media template comprising a second metadata and a second data, wherein the second metadata identifies the remaining media objects in the plurality of media objects, and wherein the second data represents the second display order; and transmitting, by the computing device, the second social media template to the social media web server, said transmission causing a second social media video to be displayed based on the second social media template.

2. The method according to claim 1, further comprising:

displaying a first social media video based on the first social media template, wherein the displaying the first social media video comprises:

displaying a first media object of the plurality of media objects for a first duration; and transitioning to the display of a second media object of the plurality of media objects for a second duration.

3. The method according to claim 2, wherein at least one of the plurality of media objects is associated with a social media website account within a social graph of the user, and wherein the displaying the first social media video further comprises obtaining the at least one media object that is associated with the social media website account.

4. The method according to claim 2, further comprising:

during the display of the first social media video, receiving a third input from the user; and in response to the third input, switch from the display of first portion of the first social media video to a display of a second portion of the first social media video, wherein the first portion is a display of first media object of the plurality of media objects and the second portion is a display of a second media object of the plurality of media objects, and wherein, according to the first display order, the second media object is to be displayed immediately after the first media object.

5. The method according to claim 1, further comprising:

displaying the first social media video based on the first social media template and a first style, wherein the first input further represents user selection of the first style, and wherein the selected first style affects a visual appearance of the first social media video.

6. The method according to claim 5, wherein the selected first style affects a display duration of at least one of the media objects of the selected subset of media objects, when the first social media video is displayed.

7. The method according to claim 5, wherein the selected first style identifies a special effect overlaid onto the first social media video, when the first social media video is displayed.

8. A mobile computing device comprising:

(a) a network interface adapted to:

receive, from a social media web server via the internet, a first social media template, wherein the first social media template comprises:

a first metadata identifying a plurality of media objects, and a first data representing a first display order in which the plurality of media objects are to be displayed; and receive an input from a first user to begin a revision process;

obtain the plurality of media objects identified by the first metadata of the first social media template;

(b) a user input device adapted to receive a first input from the first user during the revision process, wherein:

the first input represents removal of a media object from the plurality of media objects, and the first input further represents a second display order different from the first display order; and (c) a processor connected to the network interface and the user input device, the processor adapted to create a second social media template, the second social media template comprising a second metadata and a second data, wherein the second metadata identifies the remaining media objects of the plurality of media objects, and wherein the second data represents the second display order; and wherein the network interface is further adapted to transmit the second social media template to the social media web server, said transmission causing a second social media video to be displayed based on the second social media template.

9. The mobile computing device according to claim 8, further comprising a display screen adapted to:

display a first social media video based on the first social media template, wherein the processor is further adapted to:

cause a display of a first media object of the plurality of media objects for a first duration; and transition to the display of a second media object of the plurality of media objects for a second duration.

10. The mobile computing device according to claim 9, wherein at least one of the plurality of media objects is associated with a social media website account within a social graph of the first user, and wherein the displaying the first social media video further comprises obtaining the at least one media object that is associated with the social media website account.

11. The mobile computing device according to claim 9, wherein the user input device is further adapted to, during the display of the first social media video, receive a second input; and wherein the processor is further adapted to, in response to the second input, switch from the display of first portion of the first social media video to a display of a second portion of the first social media video, wherein the first portion is a display of first media object of the plurality of media objects and the second portion is a display of a second media object of the plurality of media objects, and wherein, according to the first display order, the second media object is to be displayed immediately after the first media object.

12. The mobile computing device according to claim 8, wherein the first input further represents a selection of a first style, wherein the processor is further adapted to cause the display of the first social media video, on the display screen, based on the selected first style, and wherein the processor changes a visual appearance of the first social media video based on the selected first style, when the first social media video is displayed.

13. The mobile computing device according to claim 12, wherein the processor changes a display duration of at least one of the media objects of the selected subset of media objects based on the selected first style, when the first social media video is displayed.

14. The mobile computing device according to claim 12, wherein the processor causes a display of a special effect overlaid onto the first media video based on the selected first style, when the first media video is displayed.

15. The mobile computing device according to claim 8, wherein the mobile computing device is a cellular telephone.

16. A non-transitory computer-readable storage medium having computer-executable instructions tangibly stored therein, the computer-executable instructions comprising instructions for:

receiving, from a social media web server, a first social media template, wherein the first social media template comprises:

a first metadata identifying a plurality of media objects, and a first data representing a first display order in which the plurality of media objects are to be displayed;

receiving, by the computing device, an input from a user to begin a revision process;

obtaining the plurality of media objects identified by the first metadata of the first social media template;

receiving a first input from the user during the revision process, wherein:

the first input represents removal of a media object from the plurality of media objects, and the first input further represents a second display order different from the first display order;

creating a second social media template, the second social media template comprising a second metadata and a second data, wherein the second metadata identifies the remaining media objects in the plurality of media objects, and wherein the second data represents the second display order; and transmitting the second social media template to the social media web server, said transmission causing a second social media video to be displayed based on the second social media template.

17. The non-transitory computer-readable storage medium according to claim 16, further comprising instructions for:

displaying a first social media video based on the first social media template, wherein the displaying the first social media video comprises:

displaying a first media object of the plurality of media objects for a first duration; and transitioning to the display of a second media object of the plurality of media objects for a second duration.

18. The non-transitory computer-readable storage medium according to claim 17, wherein at least one of the plurality of media objects is associated with a social media website account within a social graph of the user, and wherein the displaying the first social media video further comprises obtaining the at least one media object that is associated with the social media website account.

19. The non-transitory computer-readable storage medium according to claim 17, further comprising instructions for:

during the display of the first social media video, receiving a third input from the user; and in response to the third input, switch from the display of first portion of the first social media video to a display of a second portion of the first social media video, wherein the first portion is a display of first media object of the plurality of media objects and the second portion is a display of a second media object of the plurality of media objects, and wherein, according to the first display order, the second media object is to be displayed immediately after the first media object.

20. The non-transitory computer-readable storage medium according to claim 17, further comprising instructions for:

displaying the first social media video based on the first social media template and a first style, wherein the first input further represents user selection of the first style, and wherein the selected first style affects a visual appearance of the first social media video.

21. The non-transitory computer-readable storage medium according to claim 20, wherein the selected first style affects a display duration of at least one of the media objects of the selected subset of media objects, when the first social media video is displayed.

* * * * *